March 19, 1929.  A. L. R. ELLIS  1,706,149
SYSTEM FOR TRANSMITTING ANGULAR MOTION
Filed Oct. 4, 1926  2 Sheets-Sheet 1

Inventor:
Alvarado L. R. Ellis,
by
His Attorney.

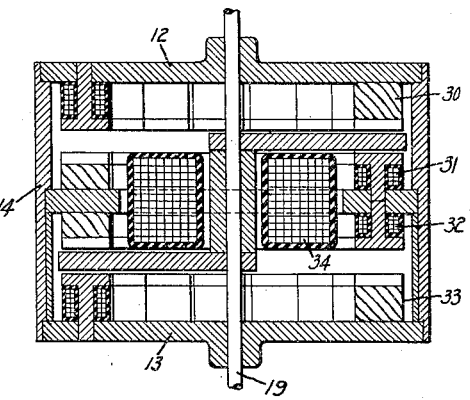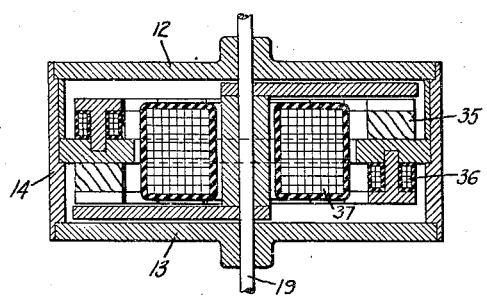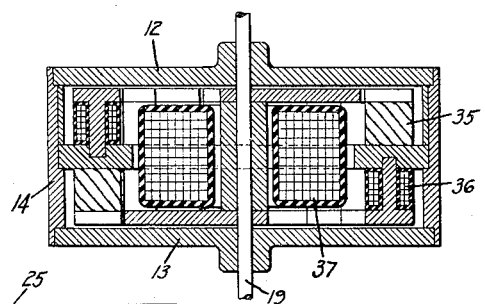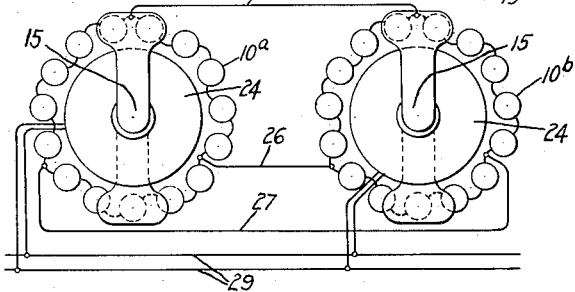

Patented Mar. 19, 1929.

1,706,149

UNITED STATES PATENT OFFICE.

ALVARADO L. R. ELLIS, OF SWAMPSCOTT, MASSACHUSETTS, ASSIGNOR TO GENERAL ELECTRIC COMPANY, A CORPORATION OF NEW YORK.

SYSTEM FOR TRANSMITTING ANGULAR MOTION.

Application filed October 4, 1926. Serial No. 139,253.

My invention relates to systems for transmitting angular motion, more particularly to electrical systems for this purpose, and has for its object the provision of a simple, reliable and inexpensive system of this type.

My invention has especial application to systems for transmitting angular motion employing instruments of an alternating current type, in which a field winding supplied with alternating current induces electromotive forces in a polycircuit armature winding. In transmitting motion two instruments of similar construction are used, one acting as a transmitter and the other as a receiver, the armature windings of the two being electrically connected together.

In carrying out my invention I form the armature winding from a plurality of helically wound coils or spools of inexpensive construction which are suitably arranged and electrically connected to form a polycircuit winding. I also provide a stationary field coil for the rotor.

Figure 1:
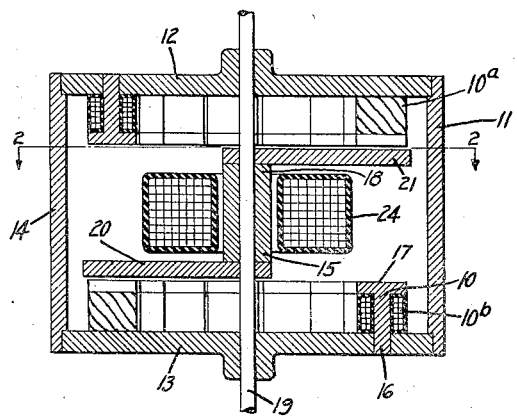
Figure 2:
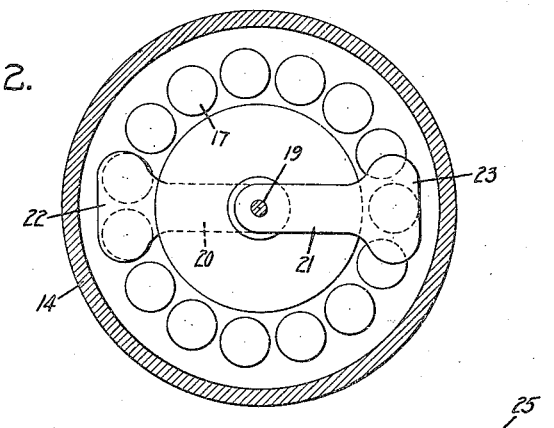
Figure 3:
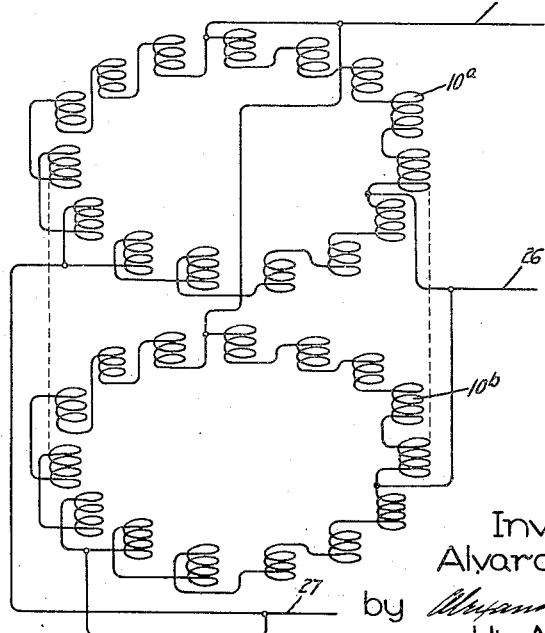

For a more complete understanding of my invention reference should be had to the accompanying drawings in which Fig. 1 is a view in section of an instrument for transmitting motion embodying my invention; Fig. 2 is a sectional view along the line 2—2 of Fig. 1, looking in the direction of the arrows; Fig. 3 is a diagrammatic view showing a method of connecting the armature coils; Figs. 4, 5 and 6 are views in section of modified forms of my invention, while Fig. 7 is a diagrammatic view showing a system for transmitting angular motion embodying my invention.

Referring to Figs. 1 and 2 of the drawing, in one form of my invention I have provided a plurality of helically wound magnet coils 10 which are arranged on the stator 11 of the instrument in two sets $10^a$ and $10^b$. As shown, the stator 11 comprises circular end pieces 12 and 13 which are secured in the ends of a cylindrical member 14 forming a part of the stator, these parts being made of magnet core iron, or other suitable material forming a path for magnetic flux. The sets of coils $10^a$ and $10^b$ are mounted on the inner faces of the end pieces 12 and 13, the coils of each set being arranged in a circle with the axis of rotation of the rotor member 15 as a center. The coils are each mounted on a spool 16 of magnet core iron which is secured to the end piece 12 or 13 as the case may be and provided with a pole face 17. The pole faces of each set of coils are arranged in a plane which is at right angles to the axis of rotation of the rotor.

The rotor 15 comprises a cylindrical member 18 secured to the shaft 19, the axis of the cylinder being coincident with the axis of the shaft. At the ends of the cylindrical member 18 are pole pieces 20 and 21 which extend at right angles to the shaft 19 in opposite directions, the outer ends of the pole pieces being closely adjacent or in front of the pole faces of the two sets of coils $10^a$ and $10^b$. The parts 18, 20 and 21 of the rotor are made of a suitable material, such as iron, forming a path for magnetic flux. It will be understood that the shaft 19 of the rotor is mounted in suitable bearings in the end pieces 12 and 13. As the rotor turns the pole pieces 20 and 21 will thus move in front of the two sets of coils $10^a$ and $10^b$, respectively. Preferably, the ends of the pole pieces 20 and 21 are increased in width so as to span more than one stationary pole face 17. As shown in Fig. 2 the wide ends 22 and 23 of the pole pieces are arranged to span two pole pieces of the stationary coils. The object in thus widening the ends is to reduce the slot effect, that is, the tendency of the pole pieces to be attracted from one stationary pole to another in step-by-step fashion, which effect would be quite pronounced if the pole pieces 20 and 21 were of such width as to span only one stationary pole 17. In the arrangement shown, each set of stationary coils is provided with 15 coils so that while one pole piece, for example the pole piece 22, as shown in Fig. 2, stands over two poles, the opposite pole piece 23 stands over one pole and partly over the two poles on each side thereof. The slot effect is further reduced by arranging the coils of the two sets $10^a$ and $10^b$ in staggered relation with respect to each other, that is, a plane passing through the axis of rotation and bisecting a coil of one set will pass between two coils of the opposite set. The rotor is provided with a stationary field coil 24. This coil encircles the cylindrical part 18 of the rotor, the part 18 being free to turn inside the coil.

The two sets of coils $10^a$ and $10^b$ are electrically connected by leads to form a suitable polycircuit armature winding. The provision of fifteen coils in each set, as shown, facilitates the connections for a three-phase winding. As shown in Fig. 3, the coils in each set are connected in series in the same direction, that is, with the coils all wound in the same manner the outer terminal of one coil will be connected to the inner terminal of the next coil and so on until the coils in each set are connected together in a closed ring. Taps are now brought out at similar and equidistant points of the two windings and the two windings are connected in parallel by connecting like taps together. Leads 25, 26 and 27 are brought out from these points of connection between the two windings.

In the operation of the device the field winding 24 is energized from a suitable alternating current supply source. This produces an alternating magnetic flux passing from one pole piece of the rotor to the stator member thence through the cylindrical portion 11 of the stator member to the opposite end and back to the other pole piece of the rotor. When the rotor is turned, this magnetic flux is shifted with respect to the stator coils and consequently the values and directions of the electromotive forces induced in the three circuits of each set of windings vary with the position of the rotor member. As shown in Fig. 7, a similar instrument constituting a receiver will be connected to the transmitting instrument, the leads 25, 26 and 27 of the two instruments being connected together and the field windings 24 of the two instruments being preferably energized from an alternating current supply source 29. It will be observed that the changes in the induced electromotive forces, produced by turning the rotor of the transmitting device, will result in an unbalanced voltage condition between the two devices, whereby currents are set up which produce torques acting on the rotors of the two devices. The rotor of the receiving devices being free is thereby caused to turn to a position of angular correspondence with the transmitting device in which position the voltages of the two devices are equal and opposite so that no currents are set up.

In the modified form of my invention shown in Fig. 4, four sets, 30 to 33 inclusive, of stator coils are provided. The sets 30 and 33 correspond with the sets 10ª and 10ᵇ of Fig. 1. The sets 31 and 32 are mounted in concentric relation with the stationary field coil 34. Each pole piece of the rotor thus moves between two sets of coils whereby an increased torque is provided as compared with the arrangement of Fig. 1. The coils of each set may be connected in series and the four sets connected in parallel as will be understood by reference to Fig 3.

In the arrangement shown in Fig 5 two sets of stator coils 35 and 36 are used, these sets being concentric with the stationary field coil 37. The pole pieces of these two sets face away from each other and the pole pieces of the rotor move in front of them. The modification shown in Fig. 6 is quite similar to that shown in Fig. 5, the pole pieces of the rotor, however, being inside or concentric with the pole pieces of the two sets of stationary coils. The arrangements of these two forms provide a very compact instrument.

Obviously various methods of connecting the armature coils may be used, the connections shown in Fig. 3 being merely illustrative. For example, instead of using the delta connection shown in Fig. 3, the coils in each set may be divided into three equal groups, the coils in each group being connected in series and the three groups connected together in a star connection. The two or more sets of star connected coils may then be connected in multiple. Another method is to connect the similar groups of coils in each set in series with each other to form three large groups, one half of the coils of each large group being in one set and the other half being in the other set. Where more than two sets of coils are provided, as shown for example in Fig. 4, the similar groups of each set may be connected in series in the same way to form large groups. These large groups may in turn be connected in delta or star. While these suggested connections are for three circuit windings, which are preferred, it is obvious that the coils may be connected to form various other polycircuit windings, for example, a two-circuit winding simulating a quarter phase armature winding.

One great advantage of my invention is the low cost of construction of the transmitting and receiving instruments. The magnet coils, for example, may be wound on automatic winding machines, as well as the field coils. The other parts of the instrument may also be constructed at very low cost. By making the armature and the field coils both stationary, brushes for the rotor element are eliminated. This is a distinct advantage in an instrument of this type, since the friction of the brushes has a detrimental effect on the accuracy of the receiving instrument.

While I have described my invention as embodied in concrete form and as operating in a specific manner in accordance with the provisions of the patent statutes, it should be understood that I do not limit my invention thereto since various modifications thereof will suggest themselves to those skilled in the art without departing from the spirit of my invention, the scope of which is set forth in the annexed claims.

What I claim as new and desire to secure by Letters Patent of the United States, is:

1. A system for transmitting motion comprising a device having rotor and stator members adapted to operate either as a transmitter or as a receiver, a plurality of sets of magnet coils on said stator members, the coils in each set being symmetrically arranged adjacent the path of said rotor member and the coils in one set being staggered with respect to the coils in the other set, leads connecting said coils into a polycircuit armature winding, a stationary field coil encircling said rotor member, a second device having stator and rotor members provided with similar windings and also adapted to be operated as either a transmitter or as a receiver, means for supplying alternating current to said field windings, and leads electrically interconnecting corresponding points of said armature windings whereby upon movement of the rotor of said first device electrical currents are produced in the armature windings of said first and second devices to cause the rotor of said second device to move to a position of angular correspondence with the rotor of said first device.

2. A system for transmitting motion comprising a transmitting device provided with a stator member and with a rotor member having two pole pieces, a pair of sets of magnet coils mounted on said stator member, the coils in each set being arranged in a circle adjacent the paths of movement of said pole pieces respectively, and the coils in one set being staggered with respect to coils of the other set, leads connecting said coils into polycircuit armature windings, a stationary field coil encircling said rotor member, a receiving device having stator and rotor members provided with similar windings, means for supplying alternating current to the field windings of said transmitting and receiving devices, and leads electrically interconnecting corresponding points of the armature windings of said devices whereby upon movement of the rotor of said transmitting device electrical currents are produced in said armature winding to cause the rotor of said receiving device to move to a position of angular correspondence with the rotor of said transmitting device.

In witness whereof, I have hereunto set my hand this 1st day of October, 1926.

ALVARADO L. R. ELLIS.